April 26, 1960  F. N. BOHNETT  2,934,391
AUTOMOBILE DESK
Filed June 16, 1958
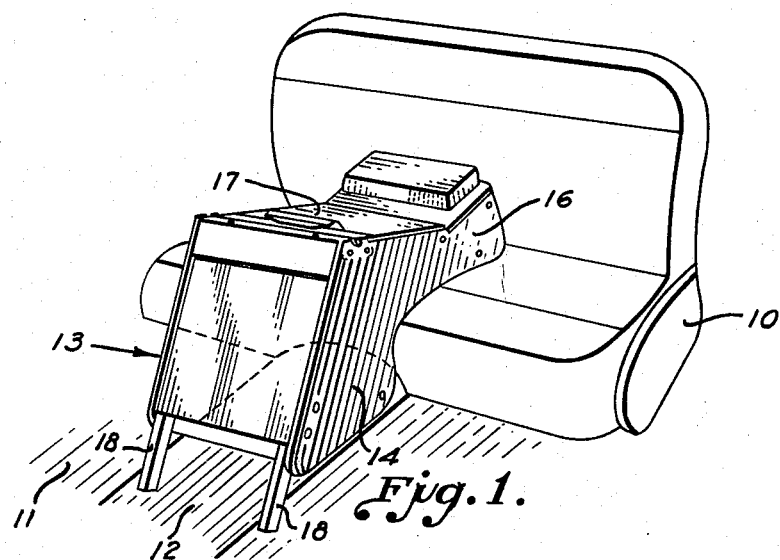
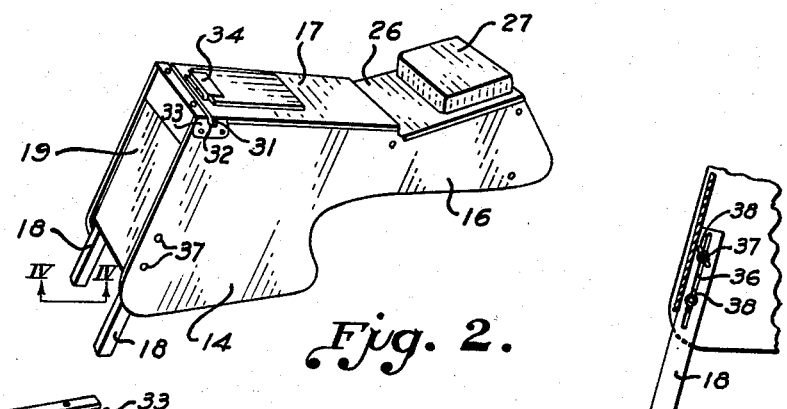
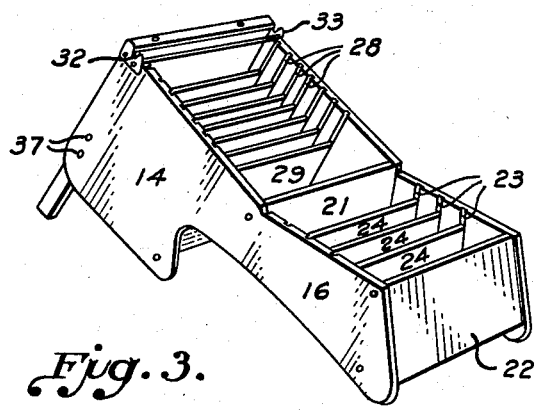
INVENTOR.
FLOYD NEWELL BOHNETT
BY
H. W. Brelsford
ATTORNEY United States Patent Office 2,934,391
Patented Apr. 26, 1960

2,934,391

AUTOMOBILE DESK

Floyd Newell Bohnett, Santa Barbara, Calif.

Application June 16, 1958, Serial No. 742,222

5 Claims. (Cl. 312—293)

My invention relates to desks for automobiles and has particular reference to an automobile desk that has a file cabinet portion as well as a writing surface.

Various attempts have been made to provide desks for stock automobiles but none of these have had sufficient acceptance to be commercial. Various folding racks have been devised to support a writing surface. Others have provided cabinets on the dash and other portions of the car to provide storage for papers, etc. Still others have been folding in nature so that they could be compacted and stored when not in use. None of these however have met the requirements of the trade sufficiently to be commercialized.

The largest group needing automobile desks are traveling salesmen. Typically, they have a file on a customer and this file is taken with them into the establishment of the customer. Numerous notations are made as the sales visit progresses, and ordinarily there are notes to be made on samples to be delivered, requests for service information, requests for catalogues, notations on errors in billings and numerous other matters. In addition, new orders are ordinarily taken. The rough pencil notes have to be transferred to appropriate forms and rather than take the customer's time, the salesman returns to his auto to do this work. A writing surface is required for this task, and preferably it should be solid and stable. When the paper work for that customer is finished, the file for the next customer is examined so that the salesman will be familiar with the points to be covered. Typically brief cases are used for files and these cases fall over during start and stop driving and are awkward to use in the front seat of an auto.

I have discovered that it is possible to combine a file cabinet and writing surface in an automobile desk in such a way that they complement and assist each other. Further, I have found that such a desk can be so shaped and designed that it can be fitted into the front seat space of the ordinary business coupe or sedan customarily used by salesmen. I have so devised my desk structure that it is stabilized by the car seat while the major part of its weight rests upon the floor of the vehicle. Additionally, this desk portion engaging the car seat for stability is capable of serving the function of a card file and minor storage, as well as serving as an elbow rest for the writing surface of the desk.

It is therefore a general object of my invention to provide an improved automobile desk.

Another object is to provide an automobile desk that combines file storage and a writing surface.

Still another object is an automobile desk that is primarily supported by the vehicle floor and which is stabilized by a portion overlying the front seat of the vehicle.

A further object is to provide a seat stabilized automobile desk wherein a seat engaging portion is used as an elbow rest while using the desk for writing.

Other objects, advantages and features of my invention will be apparent in the following description and claims considered together with the accompanying drawings forming an integral part of this application and in which:

Fig. 1 is an isometric view of the desk of the invention in position in the front seat of an automotive vehicle as viewed from a front quarter.

Fig. 2 is a side isometric view of the automobile desk of Fig. 1.

Fig. 3 is an isometric view from a rear quarter of the automobile desk of Fig. 1 with the desk top removed and the elbow rest cover removed, and Fig. 4 is a fragmentary sectional view along the line IV—IV of Fig. 2 illustrating the adjustment construction for the legs.

Referring to Fig. 1, an automobile may have a front seat 10 and an automobile floor 11 forward of the seat 10 which may incorporate the usual curved cover 12 over the drive shaft gear box, etc. The desk itself may be referred to generally by the numeral 13 and has three principal portions, a forward cabinet portion 14, a rearwardly extending arm 16 and a movable desk top 17. It will be noted particularly in Fig. 1 that the bottom edge of the arm 16 is contoured to match the shape of the seat cushion on the seat 10. It will also be noted in Fig. 1 that the forward end of the desk 13 is supported by a pair of legs 18 which may be adjustable in length to fit the particular portion of the floor 11 over which it is desired to place the desk.

Referring now to all of the figures, any convenient form of construction may be employed and I have found it desirable to make the sides of the cabinet 14 and of the arm 16 from a single sheet of material, preferably plywood. These side members may be spaced by suitable structural members such as a forward end 19, a center piece 21 and a rear wall 22. A suitable bottom piece may be disposed in the cabinet 14 and in the arm 16 and the bottom piece for the arm may be extended forwardly of the central partition 21 if desired.

From the foregoing construction it will be noted that the arm 16 is hollow and I have found it desirable to use this hollow arm for storage and its shallow depth of 4 to 6 inches makes it ideal for card file storage. To control this area better, I prefer to cut notches 23 on the interior of the arm 16 for sliding removable file boards 24 thereon. A removable cover 26 is disposed over this hollow arm 16 and this cover may be held in place by suitable projecting lugs which engage the side pieces or corner pieces. A cushion 27 is mounted on the top of this arm cover and serves as an elbow rest when the user of the desk is writing upon the desk top 17.

As shown best in Fig. 3, it will be noted that the access to the cabinet portion 14 of the desk is from the top of this cabinet portion. Here again I desire to form file slots for receiving various files and for this purpose I form slots 28 on the inner walls of the cabinet 14 into which may be slid partition boards 29. These partition boards are preferably thin and I have found that 1/8 inch thick pressed wood sheets or thin cut wood is suitable for this purpose.

The desk top 17 is provided particularly in accordance with the invention in that it is made movable and preferably removable so that ready access may be had to the file cabinet 14. For this purpose, I mount a crossbar 31 on the forward edge of the desk top 17 and this crossbar fits into a notch 32 formed in plates 33 disposed on each side of the cabinet 14. This bar 31 and notch 32 construction permits the desk top 17 to hinge about its forward edge and also permits the desk top 17 to be physically removed.

If desired, a paper pad clip 34 may be secured to the top of the desk top 17 to secure papers so that only one hand is required for writing.

Illustrated in Fig. 4 is my presently preferred construction for making the legs 18 adjustable in length. Each leg 18 has an elongated slot 36 formed therein through which may pass a pair of carriage bolts 37 secured to the side panels of the desk. Wing nuts 38 may be threaded on the projecting ends of these carriage bolts 37 and when manually tightened they hold the leg in any selected position. When the wing nuts 38 are loosened, the leg may be adjusted in length by sliding it relative to the carriage bolts.

I have found that my automobile desk is convenient to use. It is simply installed by physically picking it up and placing it in the front seat of an automobile to the right of the driver. The legs 18 are then adjusted to the desired length to give the cabinet end 14 sufficient elevation so that the seat engaging arm 16 properly fits the seat and disposes the desk top 17 at a suitable work level. Files may next be inserted by lifting the desk top 17 about the hinge structure 31—32 whereupon files may be disposed in the slots formed by the partitions 29. Thereafter, the desk top may be closed to the position illustrated in Fig. 2 and it is then ready for use. In writing, the user disposes his elbow upon the cushion 27 giving him a comfortable arm position from which he can make legible notes. The removable cover 26 on the arm 16 may be physically removed by grasping the cushion 27 to give access to the interior of the arm 16.

I have found that my desk is extremely convenient to use and that upon completing a call with a customer it forms a stable platform upon which to complete purchase orders and make the necessary notes. Thereafter, papers for one customer may be collected together and inserted in a file folder and the entire file inserted in one of the slots in the cabinet 14. I find that the hollow arm 16 is a very good place in which to place file cards which are frequently used by salesmen in keeping track of their customers. The plywood construction is inexpensive and lends itself to simple and low cost manufacture.

While I have described my invention with respect to a specific embodiment thereof, I do not limit myself to that embodiment but claim all modifications and variations that fall within the true spirit and scope of my invention.

I claim:

1. A desk for use in an automobile having a front seat and a floor forwardly of the front seat and adapted to be placed by the side of a person seated on said front seat comprising: a file storage cabinet having an access opening on the upper end thereof; a seat engaging arm portion projecting from the storage cabinet near the top thereof to overlie the front seat; and a moveable desk top disposed over the open end of the storage cabinet and extending over a forward part of the arm portion, said file storage cabinet being disposed forwardly of the front seat and being supported by said floor and forming a support for said desk top.

2. A desk as set forth in claim 1 wherein the seat engaging arm is provided on its upper surface with an elbow rest.

3. A desk as set forth in claim 1 wherein the file cabinet is provided with generally vertical partitions to divide the cabinet into generally vertical file slots.

4. A desk as set forth in claim 1 wherein the seat engaging arm is hollow and open on its upper portion and a cover is provided for said upper portion to act as an elbow rest, and the interior of the arm is used for storage.

5. A desk as set forth in claim 1 wherein the seat engaging arm is shaped on its underside to fit the contour of the front seat of the automobile.

References Cited in the file of this patent

UNITED STATES PATENTS

| 183,323 | Park | Oct. 17, 1876 |
| 2,460,712 | Peterson | Feb. 1, 1949 |
| 2,673,595 | Kump | Mar. 30, 1954 |
| 2,678,682 | Thomas | May 18, 1954 |

FOREIGN PATENTS

| 314,692 | Italy | Feb. 3, 1934 |